May 5, 1959  G. A. SIMA  2,885,210
SELF RELEASING COLLET
Filed Oct. 10, 1957
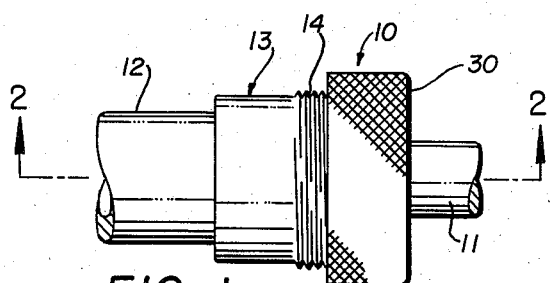
FIG. 1
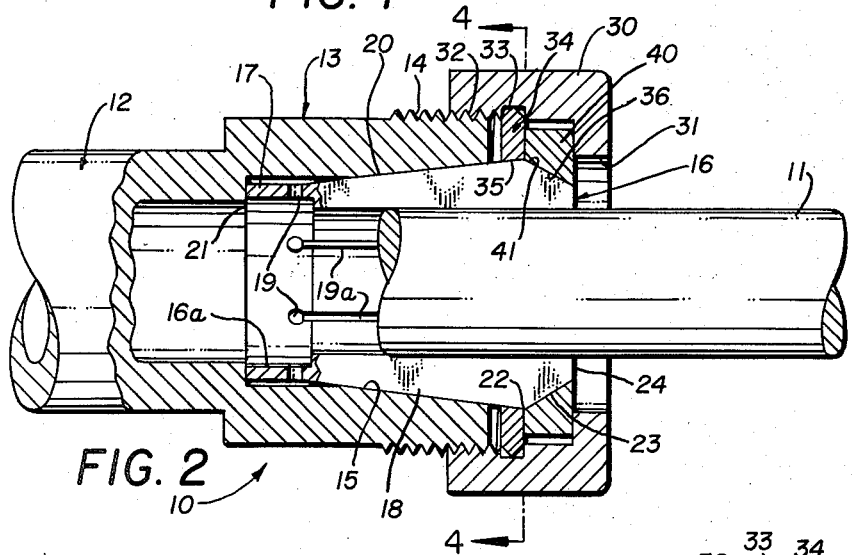
FIG. 2
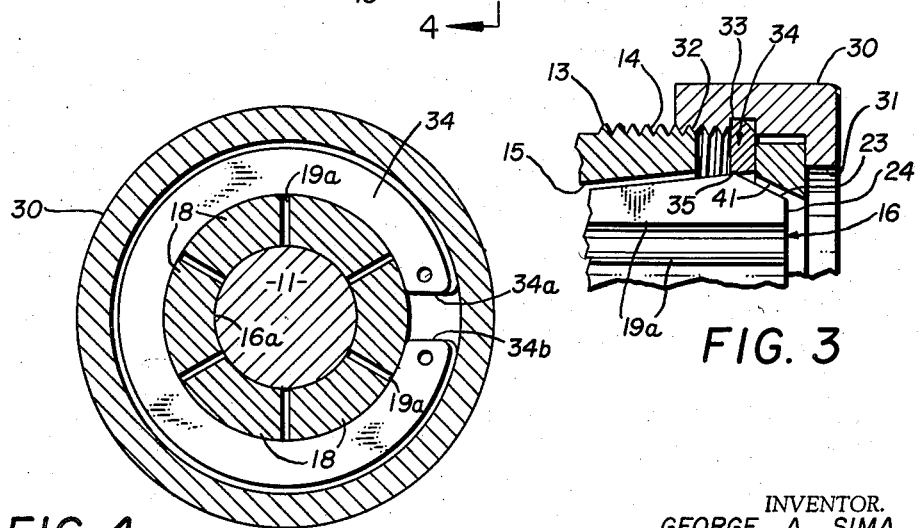
FIG. 3
FIG. 4
INVENTOR.
GEORGE A. SIMA
BY
J. William Freeman
ATTORNEY United States Patent Office 2,885,210
Patented May 5, 1959

2,885,210

SELF RELEASING COLLET

George A. Sima, Macedonia, Ohio

Application October 10, 1957, Serial No. 689,444

6 Claims. (Cl. 279—49)

This invention relates to the art of collets and in particular has reference to an improved type of collet wherein means are provided for effectively removing the collet from the holder after usage thereof.

In United States Letters Patent 2,272,185, issued on February 10, 1942, to Windsor N. Chittenden, there is disclosed a collet chuck of the general class herein being considered. Basically, the collet chuck of the above patent featured the use of a collet member having convergent tapered surfaces on the gripping jaw portions thereof, with this collet being seated in a tool holder and being securely retained in place therein by use of a locking nut and a compensating ring.

While the collet of the above-captioned United States Patent operates satisfactorily during usage, it has been found in the past that removal of the same is oftentimes difficult because of the fact that the collet becomes tightly seated within the socket of the tool holder during usage.

Accordingly, to the present time, it has not been possible to effectively remove a collet of this type from the socket within which the same is seated without considerable difficulty.

It has been proposed in the past to provide an interlocking arrangement between the collet and the nut member associated therewith so that upon unthreading, or backing off, of the tightening nut, the collet will automatically be shifted axially of the tool holder so as to become automatically unseated. While devices of this type have in some instances performed satisfactorily, it is of course manifest that use of a device of this type requires a modified form of collet member, with the result that existing collet structures cannot be adapted to include this feature. Additionally, collets of this special type require special machining and accordingly are not interchangeable with ordinary collets, with the result that a separate supply of such collets must at all times be maintained. The above disadvantages have materially reduced the practical value of such collets.

It has been found that the desirous features of mechanical interlock can be achieved on standard collets of the type set forth in the Chittenden patent by equipping the adjustment nut thereof with a radially inwardly projecting wedge ring that will complementally engage a tapered external surface of this type of collet when the same has a tool positioned therein. In this manner, the positioned tool will prevent radial collapse of the gripping jaws of the collet, with the result that axial shifting of the adjustment nut will automatically result in unseating of the collet with respect to the tool holder due to the contact between the wedge ring and the collet.

It has been further found that by making this wedge ring operate against a localized surface of the collet, that the collet can be separated from the wedge ring by merely collapsing the collet after the tool has been removed.

It accordingly becomes a principal object of this invention to provide an improved type of collet chuck that is characterized by the presence of means for positively removing the collet from the socket therefor.

It is a still further object of this invention to provide an improved type of collet chuck that is characterized by its ability to positively unseat a collet from its socket in a tool holder with a modicum of effort.

It is a still further object of this invention to provide a collet chuck of the type above-described that is simple to manufacture and efficient to use, to thereby result in a low-cost production tool.

These and other objects of the invention will become more apparent upon a reading of the following brief specification considered and interpreted in the light of the accompanying drawings.

Of the drawings:

Figure 1 is an elevational view of the improved collet chuck.

Figure 2 is a sectional view taken of the lines 2, 2 of Figure 1.

Figure 3 is a fragmentary view similar to Figure 2 but illustrating the position of the component parts during removal of the collet from the adjustment nut.

Figure 4 is a view taken on the lines 4, 4 of Figure 2.

Referring now to the drawings, it will be seen that the improved collet chuck, generally designated by the numeral 10, serves to concentrically dispose a tool 11 about the axis of rotation of a machine tool spindle 12, with the collet means 10 releasably securing the tool 11 in position, as is shown in Figure 1.

Considering first the structure of the machine tool spindle 12, it will be seen that the same includes a head portion 13 of enlarged cylindrical diameter, that is externally threaded, as at 14, for coaction with the collet means 10, as will presently be described. Additionally, the head portion 13 is provided with a tapering internal socket 15, within which an appropriately contoured collet 16 may be received, as is clearly shown in Figure 2 of the drawings.

The preferred type of collet illustrated in Figure 2 of the drawings is of the type set forth in the above referred to Chittenden Patent 2,272,185 and accordingly includes a skirt portion 17 and a plurality of flexible jaw portions 18, 18 with apertures 19, 19 and slits 19a, 19a (Figure 4) permitting flexure of the jaw members 18, 18 in known manner.

Similarly, and for the purpose of coacting with the tapered socket 15, the collet 16 is further provided with an axially extending tapering surface 20 that extends, as shown, from end 21 of collet 16 to a maximum diameter point that is indicated by the numeral 22 in Figures 2 and 3 of the drawings. Similarly, a second tapering surface 23 extends between the maximum diameter point 22 and end portion 24 so as to coact with remaining elements of the collet means as will presently be described.

To this end, the overall collet means 10 further include an adjustment nut 30, of generally cylindrical configuration, and having a bore 31 through which the tool 11 may be passed as is shown in Figure 2 of the drawings. Also, the internal wall of the member 30 is threaded, as at 32, with a cylindrical groove 33 being provided adjacent the inboard end of threads 32 for reception of a wedge ring member indicated generally by the numeral 34.

To the end of coacting with the collet 16, the internal surface 35 of ring 34 is shown tapering at an inclined angle to the axis of rotation of tool 11 with the degree of such tapering corresponding to the taper of the surface 20 so as to permit the surfaces 20 and 35 to complementally engage in parallelism as is shown in Figure 2 of the drawings.

Also, and as shown best in Figures 2 and 3 of the drawings, the overall collet means 10 preferably includes a compensation ring 40, that fills the axial void between ring 34 and flange portion 36 so as to be in effect carried by the member 30 at all times. This ring 40 includes a tapering internal surface 41 that mates with the surface 23 of collet 16.

In use or operation of the improved collet, it will first be assumed that the collet means 10 have been detached from the machine tool spindle 12, with the collet 16 having been removed therefrom. In this condition, the collet 16 may be first assembled with respect to the members 30, 34 and 40 by passing the maximum diameter point 22 thereof beyond the minimal diameter portion of ring 34, with the jaws 18, 18, collapsing during said movement. Assuming that the collet 16 has been loosely positioned with respect to the members 30, 34 and 40, as just described, it will be seen that the collet 16 may then be loosely seated in socket 15 and primarily positioned therein by merely engaging threads 32 with the external threads 14 that are provided on the head portion 13 of spindle 12. At this point, the tool 11 may be positioned within the internal bore 16a of the collet and upon tightening of the adjustment nut 30, it is believed apparent that compensator ring 40 will, through its action against surface 23, firmly seat the collet 16 within the socket 15, with such seating occurring simultaneously with a radial collapsing of the jaws 18, 18 about the tool so as to result in the tool 11 being firmly grasped in non-rotatable and axially fixed relationship with the machine tool spindle. It is of course manifest that the same result could occur by first positioning the collet 16 in socket 15, followed by positioning of nut 30 and the parts associated therewith, with the tool 11 being inserted in bore 16a after positioning of nut 30 and parts associated therewith.

At this point, the tool may be used in normal fashion.

When it is desired to remove the collet, it is merely necessary that the adjustment nut 30 be backed off by imparting counter-clockwise (Figure 2) rotatable movement thereto. As a result of this rotational movement, the ring 34 will move an equivalent axial distance with the nut 30 due to the fact the same is carried by adjustment member 30. This movement of the ring 34 will automatically cause an equivalent axial movement to the right of Figure 2 of the collet 16, due to the wedge-like engagement between the complemental surfaces 35 and 20. This wedge-like movement will occur due to the fact that the tool 11 is positioned within the internal bore 16a, and thus the individual jaws 18, 18 are incapable of radial collapse with the result that wedging movement will occur to automatically unseat the collet 16 from socket 15.

When it is desired to remove the collet 16 with respect to the adjustment nut 30 and the parts associated therewith, it is merely necessary that the tool 11 be removed from the bore 16a, and upon such removal of the tool, it is apparent that the individual jaws 18, 18 can radially collapse so as to permit the maximum diameter point 22 to be collapsed to a point where the same will axially pass by the inclined surface 35 of ring member 34. This condition is clearly illustrated in Figure 3 of the drawings.

In the preferred embodiment illustrated herein, the wedge ring 34 is preferably of the split type so as to define edge surfaces 34a and 34b as shown in Figure 4. It is to be understood that other types of rings could be employed in this regard.

It will be seen from the foregoing that there has been provided a new and novel type of collet means that features automatic removal of the collet from the tool holder with a minimum of effort. It has been shown how the same effort that is employed to loosen the tool with respect to the collet operates to simultaneously unseat the collet with respect to the tool holder, with positive wedging action between complemental surfaces being the force effectuating unseating of the collet.

While a full and complete disclosure of the invention has been set forth in accordance with the dictates of the patent statutes, it is not intended that the invention be so limited. Accordingly, modifications of the invention may be resorted to without departing from the spirit hereof or the scope of the appended claims.

What is claimed is:

1. A collet chuck mechanism of the character described, comprising; a tool holder adapted to cooperate with a machine tool and having a tapered socket in one end thereof; a collet insertable in said socket and formed with a plurality of gripping jaws that flex inwardly as said collet is pressed into said socket, with the external surfaces of said gripping jaws defining a pair of radially outwardly tapering surfaces that converge to define a maximum diameter point for said collet; a compression member shiftable axially of said tool holder and having an end flange through which said collet may be passed; a compensator ring seated against said end flange and having an internal edge surface complemental to one said tapered surface of said collet; and a ring member carried by and projecting radially inwardly of said compression member and having an internal edge surface that is complemental to said remaining tapered external surface of said collet; said internal edge surface of said compensator ring and said ring member frictionally engaging said respective tapered surfaces upon relative axial movement between said compression member and said tool holder.

2. A collet chuck mechanism of the character described, comprising; a tool holder adapted to cooperate with a machine tool and having a tapered socket in one end thereof; a collet insertable in said socket and formed with a plurality of gripping jaws that flex inwardly as said collet is pressed into said socket, with the external surfaces of said gripping jaws defining a pair of radially outwardly tapering surfaces that converge to define a maximum diameter point for said collet; a compression member shiftable axially of said tool holder and having an end flange through which said collet may be passsed; a compensator ring seated against said end flange in shiftable relationship therewith and having an internal edge surface complemental to one said tapered surface of said collet; and a ring member carried by and projecting radially inwardly of said compression member and having an internal edge surface that is complemental to said remaining tapered external surface of said collet; said internal edge surface of said compensator ring and said ring member frictionally engaging said respective tapered surfaces upon relative axial movement between said compression member and said tool holder.

3. A collet chuck mechanism of the character described, comprising; a tool holder adapted to cooperate with a machine tool and having a tapered socket in one end thereof; a collet insertable in said socket and formed with a plurality of gripping jaws adapted to receive a tool and flexing inwardly to grip said tool upon being pressed into said socket; the external surfaces of said gripping jaws being defined by a pair of radially outwardly tapering surfaces that converge to define a maximum diameter point for said collet; a compression member shiftable axially of said tool holder and adapted to frictionally engage the outermost portion of said tapered surfaces when said collet is seated in said socket, whereby axial shifting of said compression member relatively of said tool holder will press said collet into said socket; and means carried by said compression member and frictionally engaging said innermost tapered surface of said collet upon axial movement of said compression member away from said socket, whereby said collet can be unseated.

4. The device of claim 3 further characterized by the fact that said collet can be passed axially of said means upon collapsing of said gripping jaws.

5. In combination with a tool holder having a tapered socket at one end thereof, within which is seated a projecting collet having radially outwardly tapering surfaces that converge to define a maximum diameter for said collet, with said tapered surfaces including a socket engaging surface and an outer tapered surface; a compression member shiftably carried by said tool holder and being engageable with said outer tapered surface of said collet to press the same into said socket upon relative axial movement of said compression member relatively of said tool holder; a wedge ring carried by said collet and being frictionally engageable with said socket surface, whereby said collet may be unseated from said socket upon movement of said compression member away from said socket.

6. A compression ring for use on an externally threaded tool holder that has a tapering socket at one end thereof, within which is received a radially collapsable collet having a tapered socket engaging surface and a tapering outer surface that has one axial end thereof joining with an axial end of said tapered socket surface to define a maximum diameter point for said collet, comprising; a tubular section having an axially extending internal wall section that is threaded adjacent one axial end thereof for engagement with said external threads of said tool holder; a compression surface defined by one axial end of said tubular section and being adapted to engage said outer tapered surface, whereby said collet may be pressed into said socket upon rotation of said tubular section on said tool holder; and a projecting rib member carried by an end extending radially inwardly of said internal wall section and defining a radially innermost edge surface adapted to complementally engage said tapering socket surface of said collet, whereby said collet may be unseated upon unthreading of said tubular section relatively of said tool holder.

References Cited in the file of this patent

UNITED STATES PATENTS

| | | |
|---|---|---|
| 1,973,942 | Buhr | Sept. 18, 1934 |
| 2,002,282 | Tessky | May 21, 1935 |
| 2,272,185 | Chittenden | Feb. 10, 1942 |
| 2,469,014 | Stalhandske | May 3, 1949 |